Patented July 11, 1939

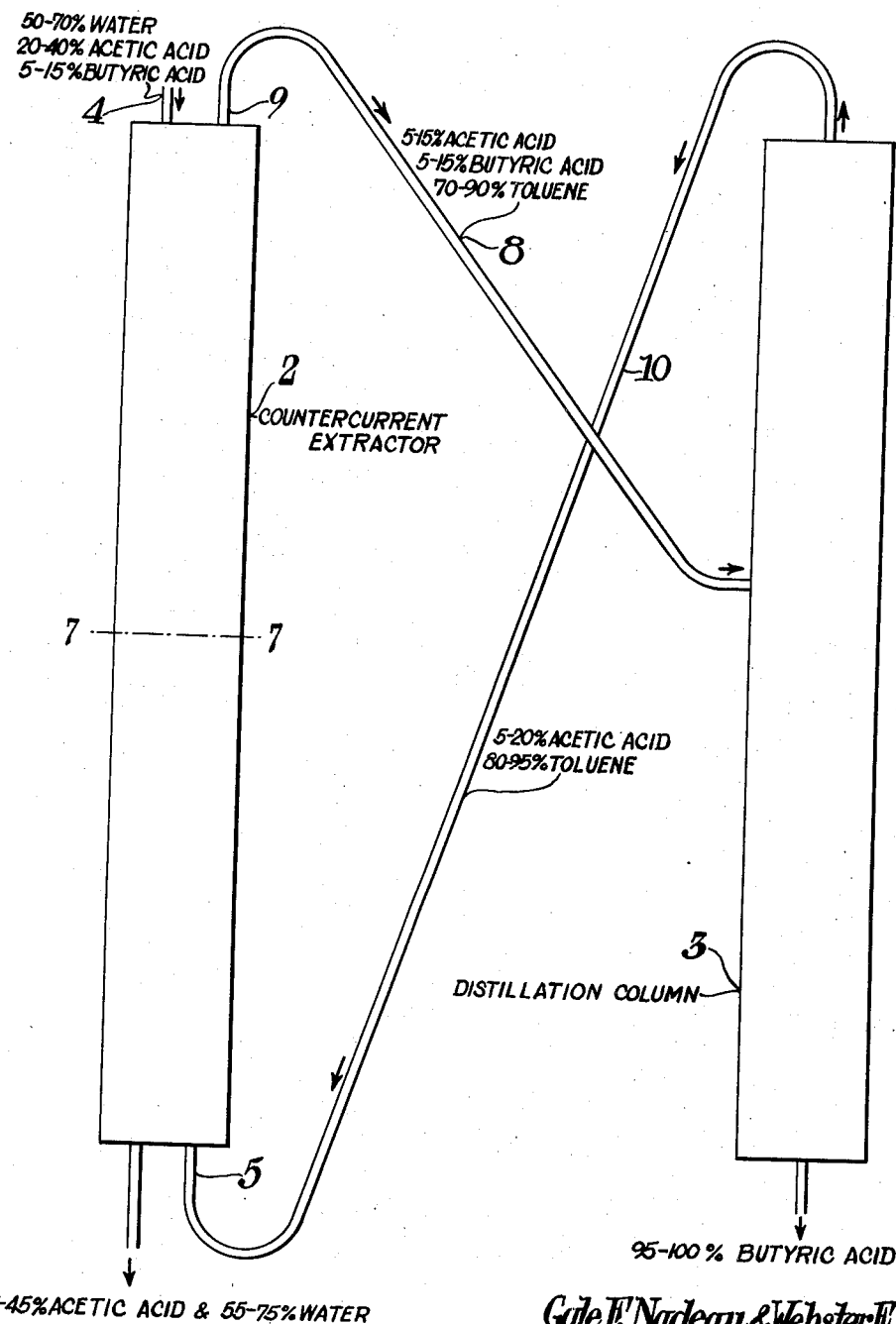

2,165,293

UNITED STATES PATENT OFFICE 2,165,293

PROCESS OF SEPARATING AND RECOVERING ALIPHATIC ACIDS

Gale F. Nadeau and Webster E. Fisher, Rochester, N. Y., assignors, by mesne assignments, to Eastman Kodak Company, Rochester, N. Y., a corporation of New Jersey Application February 12, 1936, Serial No. 63,615

7 Claims. (Cl. 260—225)

This invention relates to processes of separating and recovering aliphatic acids and more particularly to a process of separating and recovering acetic and butyric acid mixtures, such as for example, obtained in a cyclic process for producing cellulose acetate butyrate.

The separation, recovery and utilization of the mixtures of aliphatic acids obtained in various processes is a problem of great technical importance. For example, certain processes such as the manufacture of cellulose acetate butyrate by precipitation from its reaction mixture yields large quantities of acetic-butyric acid mixtures and it is with these mixtures that our invention is particularly concerned. However, there are various other sources of acetic-butyric acid mixtures, such as for example, the acid liquids together with the various impurities obtained by the distillation of wood may comprise acetic-butyric acid mixtures. Also mixed acids may be produced by the action of micro organisms. Acids from these various sources are generally obtained in an aqueous state and must be separated and concentrated in order to obtain useful commercial products.

Since butyric acid and water will form a mixture having a constant boiling point and since acetic acid does not readily separate from water, it is apparent that aqueous acetic-butyric acid mixtures cannot be satisfactorily separated and recovered by distillation alone. In fact, mere distillation alone of an aqueous solution of acetic and butyric acids may yield a distillate of a composition not much different from the solution being distilled. It is, therefore, obvious that to provide a simple process for the separation and recovery of acid mixtures which is efficient, is a highly desirable result.

Various processes for the separation and recovery of aliphatic acids have been devised, among which may be mentioned a method which consists in, first, dehydrating the acids either through neutralization and treatment with sulfuric acid or by an azeotropic distillation of the water from the acid mixture. After the acids are dehydrated they are separated by fractional distillation. It has also been proposed to treat aqueous solutions of acetic and butyric acids with a water-soluble normal inorganic salt of an acid at least as strong as acetic and thereafter extracting the salted solution with benzol, ketones or phenols.

Malm and Nadeau have devised an extraction method for separating acetic-butyric mixtures, and in particular, mixtures from cellulose acetate butyrate manufacture by the use of certain selective solvents such as decalin (decahydronaphthalene). It is with this method that our process is primarily concerned, our process being an improvement thereover.

We have developed a group of selective extracting agents for separating and recovering dilute aliphatic acid mixtures which have proved to be superior in many respects to any heretofore known together with a new cyclic process for utilizing these agents, inasmuch as these agents are very efficient and form extracts from which the acid component may be readily recovered.

This invention has as an object to provide a process for separating and recovering acetic and butyric acids. A further object is to provide a process which is applicable not only to relatively pure water solutions of acetic and butyric acids but also to the treatment of mixed acids from crude aqueous solutions such as obtained in the distillation of wood. A still further object is to provide a process for the separation and recovery of butyric acid mixed with varying proportions of other aliphatic acids. Another object is to provide a process in which the extract carries with it, in addition to butyric acid, only a very small amount of acetic acid and water. A further object is to provide a process of acid separation in which extraction is the main factor. It is also an object to provide a process which will be simple and inexpensive and yet applicable to solutions containing any amounts of acetic and butyric acids. Another object is to provide an extracting agent that removes large amounts of butyric acid per unit of extracting agent. A still further object is to provide a solvent which produces an extract from which the acid component may be readily recovered.

Still another object is to provide a cyclic process of producing cellulose acetate butyrate involving the step of separating and recovering aliphatic acids by extraction. It is also another object to provide a continuous process of producing cellulose acetate butyrate in which a variety of selective extracting agents may be employed for recovering acetic and butyric acids. Other objects will appear hereinafter.

These objects are accomplished by the following invention which comprises primarily a selective extraction process for separating and recovering aliphatic acids and a cyclic process of producing cellulose acetate butyrate. We have found that highly desirable results may be obtained in separating and recovering acetic and butyric acids by selecting an extraction medium which will extract one of the acids from an aqueous solution without extracting the other acid.

Since acetic and butyric acids are homologues, considerable difficulty is encountered in selecting a liquid which is substantially immiscible with water; substantially immiscible with an aqueous solution of a mixture of acetic and butyric acids in varying amounts; and will remove substantially only butyric acid, accompanied by only small quantities of acetic acid, from such a solution.

We have found a group of solvent materials possessing these properties and the property of producing an extract from which the acid component may be readily recovered. We have found that a number of chemical materials such as the halogenated hydrocarbons or hydrocarbons such as toluene could be used in separating butyric acid from acetic acid. The extracted butyric acid contains only small quantities of acetic acid, which can be removed in the final rectification of the recovered acid. In all instances the extract obtained was of such a character that the butyric acid could be readily recovered therefrom, as by distillation. In the instance of the toluene group of agents, these materials possessed the added and marked characteristic of permitting a separation of any small amounts of acetic acid in the extract as will be more fully described hereinafter.

Our preferred extracting agent, toluene, is therefore further distinguished by the fact that the extraction of butyric acid from aqueous solutions may take place over a wide range of mixed acid concentration, without the extract containing amounts of acetic acid which interfere. Furthermore, the extract does not require extensive treatment in order to recover the butyric acid.

Our process may be carried out in any apparatus of a known type although in commercial operations it is to be noted that we prefer to employ a system which includes counter-current extraction apparatus. For example, in carrying out our extraction on a production scale, the counter-current system would be employed in our cyclic process as follows: It is understood that the values set forth are merely for the purpose of illustration. Cellulose may be pretreated with a mixture of butyric and acetic acids and then esterification is carried out after the addition of acetic anhydride. The dope is then obtained by precipitation, for example, by using an acid precipitating solution. The precipitation liquid resulting is then separated by decantation or in some other suitable manner and counter-currently treated in a battery of counter-current extractors with a halogenated or toluene type hydrocarbon fully described herein. This selective solvent separates and permits the recovery of substantially all of the butyric acid. The acetic acid in the water layer from the counter-current extractors then may be neutralized and the acid converted into acetic anhydride or the acetic acid may be concentrated by distillation in accordance with the procedure set forth in applications 513,989, 744,250 or 26,226 now Patent Nos. 2,028,800, 2,049,440 and 2,049,441, and then converted to the anhydride which is employed for the aforementioned anhydride additions in the esterification step.

We have found that our preferred agent comprising toluene possesses all of the desirable qualities of an organic solvent for use in the separation of mixtures of butyric and acetic acids by selective extraction. It is suitable not only when used in the separation of dilute mixtures but also in the separation of concentrated acid mixtures containing 50% or higher of mixed acids. This selective solvent, toluene, also known as phenylmethane is a hydrocarbon with the following formula:

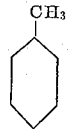

This selective solvent as well as the other solvents embraced by our invention are preferably employed in relatively pure condition but beneficial results may be obtained employing the solvents in admixture with other materials which do not detrimentally affect their function or one solvent may be mixed with another solvent. Hence, our invention in its broader aspects embraces any such diluted solvents and the use of our novel solvents either in the chemically pure or commercially obtainable form.

Further details concerning the use of our new selective solvents may be observed from a consideration of the following examples, the first concerning the halogenated group:

In a three-stage extractor about 100 lbs. of a mixture containing approximately 9.7% butyric acid, 30.3% acetic acid, and 60.0% water was extracted in a counter-current manner with about 117 lbs. propylene chloride. The water emerged from the extractor containing only about .4% butyric and 26.2% acetic acid. The propylene chloride emerged containing 7.2% butyric acid and 6.4% acetic acid. Thus the acid enters, containing 75.7% acetic acid of the total acid present and leaves containing at least 98.5% acetic acid of the total acid, while the emergent propylene chloride contains 53% butyric acid based on total acid. The propylene chloride was fractionated from the acetic and butyric acid mixture and this mixture, containing 53% butyric acid and 47% acetic acid is distilled if necessary and reused; for example, in the manufacture of cellulose acetate butyrate. The water which now contains 26.2% acetic acid and 0.4% butyric acid may be concentrated by extraction with propyl acetate or by azeotropic distillation with ethylene chloride, propylene chloride or propyl acetate or in accordance with the procedure set forth in the aforementioned patents, or it may be neutralized, the water distilled off and the acid converted into acetic anhydride. It may be desirable, before subjecting the extracted acid to some of these further separations to remove the small traces of propylene chloride which are dissolved in the extracted acid, by subjecting it to distillation to flash off the propylene chloride.

The above example is not necessarily the most efficient way of carrying out the process. It may be desirable to vary the number of stages in the extractor or vary the ratio of propylene chloride to aqueous acid, depending on an economic balance between the degree of separation desired and the cost of achieving it.

While it may be seen from the above data that we have used propylene chloride and generally prefer this agent when employing a halogenated hydrocarbon, we do not wish to be limited to the exact agent shown since it has been given by way of illustration only, and there are other agents of their group which give useful results such as ethylene chloride and the like. Similar procedure may be applied in the separation of mixtures of acetic and propionic acid or mixtures of propionic and butyric acids.

Our invention embraces other halogenated compounds, including chlorinated and brominated aliphatic and unsaturated straight chain hydrocarbons and halogenated mono- and bi-cyclic hydrocarbons, it being understood that such other agents possess the properties outlined with respect to ethylene and propylene chloride. Namely, these agents must be capable of preferentially extracting the butyric acid, immiscibility with water, and incapable of forming a constant boiling mixture with butyric acid. Carbon tetrachloride and trichloroethylene have these properties as well as the property to be described below with respect to toluene, namely, capability of forming an azeotrope with acetic acid.

These halogenated hydrocarbons are also capable of extracting butyric from its aqueous solutions when not in admixture with other acids. Hence, butyric acid may be recovered from its aqueous solutions by extraction followed by distillation of the extract.

Considering now the group of selective solvents referred to as the aromatic with side chain, or toluene group. The characteristics of these hydrocarbons to be particularly noted are that they form constant boiling mixtures with acetic acid, but not with butyric acid. They will extract butyric acid from an aqueous solution in preference to acetic acid, and the azeotrope preferably contains enough acetic acid so that all the acetic acid taken up by the extracting agent will be removed when the latter is fractionated.

One compound which meets these conditions is toluene, which forms no azeotrope with butyric acid, but forms an azeotrope with acetic acid, boiling at 105° C. and containing 34% acetic acid by weight. Any other hydrocarbons and chlorinated hydrocarbons boiling between the general limits of about 70–120° C. which fulfill the requirements are embraced by this invention.

The operation of our process with the member toluene is better understood by reference to the accompanying drawing forming a part of the present application.

Fig. 1 is a diagrammatic side elevation showing, in flow sheet arrangement, apparatus for carrying out our invention. In Fig. 1, 2 represents a continuous counter current extracting system, either as a unit or in a number of separate units. Numeral 3 represents a distillation column. At 4 there is fed into the extractor an aqueous solution containing about 30% acetic acid and 10% butyric acid. At 5 there is fed into the extractor an equal weight of toluene containing about 10% acetic acid, this mixture having been recovered from a point later in the process. As the weak acid proceeds down the column, the butyric acid is extracted into the toluene, along with some acetic acid. Although the extractive power of toluene and other hydrocarbons for acetic acid is very poor, the presence of appreciable amounts of butyric acid increases the solubility of acetic acid. By the time the weak acid has reached some point near the middle of the extraction system, such as zone 7—7, substantially all of the butyric acid has been extracted by the toluene, while the acetic acid has been reduced from 30% to about 25%. The toluene leaving the top of the extractor through pipe 8 at 9 contains both the acetic and butyric acid, and therefore contains about 9% acetic acid and 9% butyric acid.

The toluene extract is then continuously conducted to the distillation column 3, which is so run that the acetic acid and toluene are distilled from the top of the column, while the butyric acid, substantially free of both, is removed from the bottom of the column, either as vapor or liquid.

As already pointed out, certain of our new selective solvents, such as toluene, are characterized by being capable of forming an azeotrope with acetic acid in the presence of butyric acid, and form no azeotrope with the butyric. Consequently, the separation of any acetic acid in the butyric is caused to take place very readily.

The mixture of toluene and acetic acid is then fed from the head of the distillation column, by conduit 10, preferably through a storage tank (not shown), to the lower end of the extractor at 5, as outlined above.

Now in the absence of butyric acid, the distribution ratio of acetic acid between toluene and water is overwhelmingly in favor of the water. Hence, even though the weak acid going down through the extractor contains some 25% acetic acid at zone 7—7, it easily extracts most of the acetic acid from the toluene so that by the time the latter has reached the zone 7—7 in the extractor, all but about 1% of the acetic acid has been extracted back into the aqueous layer. The toluene is then ready to proceed up the column and extract more butyric acid, while the weak acid emerging from the bottom of the extractor has regained all of its original acetic acid and may be recovered by any of the many processes outlined above. It may be desirable to flash off any toluene from the weak acetic acid before the latter is recovered.

There may be some variation in the apparatus and technique used, without departing from the spirit of this invention. For instance, it is not necessary to carry out the distillation in a continuous still. An intermittent still can be used and, under certain circumstances, might be economically justified. The extraction may, if desired, be carried out in two separate extractors, the butyric acid extraction being carried out in one, the acetic acid re-extraction in the other, rather than having the whole operation carried out in one extractor. It is possible that the same extractor could be used for both extractions, say being used for one extraction one day and for the other the next, though it is doubtful if this would be as desirable as continuous operation.

In the attached drawing wherein we have designated distillation columns and the like, these illustrations are merely diagrammatic. It will be understood that these figures embrace the use of condensers, vapor feeds, reflux lines, storage tanks and similar parts employed in distillation set-ups.

While we have described our method of extraction as applied to the separation of acetic and butyric acid mixtures because it is particularly adapted thereto, the method has other applications.

The method used for this separation is new and novel in itself. This method may be generically described as: (1) The extraction of a solute A (butyric acid) from a solvent B (water) containing another solute C (acetic acid) which, only by reason of the presence of A (butyric acid) is partially extracted into the extracting solvent D (toluene); (2) The separation of the solute A (butyric acid) from the solvent D (toluene), leaving solute C (acetic acid) in solvent D (toluene), by distillation or other means; (3) The re-extraction by B (water) of the solvent D (toluene) to return the solute C (acetic acid) from D (toluene) to B (water). It is only because of the presence of A (butyric acid) in D (toluene) that D (toluene) extracts some of C (acetic acid) and, now that A (butyric acid) has been removed, C (acetic acid) will again be extracted into B (water).

Assuming toluene is to be employed in our new cyclic process of producing cellulose acetate butyrate, the following is a simple illustration of the steps:

An esterifying bath is prepared including butyric acid and acetic anhydride together with acetic acid or a derivative thereof such as for example chloracetic acid. There may also be thoroughly incorporated into this bath a catalyst such as magnesium perchlorate, fused zinc chloride or other esterification catalyst. It is also possible to employ butyric anhydride and acetic acid rather than the combination stated.

As a source of cellulosic material to be esterified by this bath, we may employ cotton fiber tissue paper, clean cotton, surgical cotton wool, or carefully prepared bleached sulfite wood pulp. The cellulosic materials are thoroughly mixed into the esterifying bath which is maintained at a temperature sufficient to cause esterification. This will vary dependent upon the catalyst, reactants, etc. A clear mixture or dope results.

The cellulose acetate butyrate may be isolated by pouring the dope into water, separating, washing and drying the resulting ester. However, we would prefer to isolate the ester in a precipitation liquid having substantial acid content rather than by precipitation in water.

The mixed ester and the butyric-acetic acid containing liquid which surrounds it are separated by decanting, centrifuging or in some other suitable manner and the butyric-acetic acid solution is conducted to an extraction unit. This unit preferably comprises a plurality of counter current extractors wherein the butyric-acetic acid mixture is brought in intimate contact with the selective solvent, preferably comprising toluene.

This solvent takes up substantially all of the butyric acid and only a small quantity of acetic acid. A water layer containing substantial amounts of acetic acid is obtained from the extractors and it can be converted into concentrated acetic acid and acetic anhydride to be used in the esterifying step. That is, the acetic acid remaining in the water layer may be neutralized, the water distilled off and the acetate resulting converted into acetic anhydride. Or the dilute acetic acid may be subjected to azeotropic distillation as already indicated by the procedure of application, 513,989, 744,250, or 26,226 now Patent Nos. 2,028,800, 2,049,440 and 2,049,441 to obtain concentrated acetic acid which can be pyrolyzed to yield acetic anhydride.

The butyric acid is easily recovered by a rectification of the extract as already described during which any moderate amounts of acetic acid present will be removed as a constant boiling mixture with the toluene. This is an important recovery feature.

The recovered acetic acid, together with any additional anhydride or acid to make up for materials lost or consumed in the reaction is employed in the esterifying step. Likewise the butyric acid is recovered, supplemented with more acid, and employed in the esterifying step.

There are a number of advantages derived from the cyclic process of producing cellulose acetate butyrate. The overall efficiency of the cellulose acetate butyrate process is greatly increased by being able to recover the acetic and butyric acids and put them immediately back into the process. The agents described permit a satisfactory separation and allow the recovery of the acids without the use of salts or other agents heretofore required in the prior art.

In the preceding description we have set forth numerous details concerning toluene, ethylene chloride and propylene chloride because these selective solvents are considered particularly satisfactory.

In our investigation we have also determined that there are other compounds which give useful results and which may be employed in the above described processes, such as for example: cyclohexane, cyclohexene, and methylcyclohexane. These agents are similar to toluene in that they form azeotropes with acetic acid. For example, cyclohexene forms an azeotrope containing about 6.5% acetic acid and methylcyclohexane forms an azeotrope containing about 31% acetic acid, therefore, we have shown a variety of agents which offer a considerable latitude of operation. These other agents are generically designated by the expression an inert organic liquid characterized by having a preferential solvent affinity for butyric acid and substantial immiscibility with water, and incapable of forming a constant boiling mixture with butyric acid.

Having thus described our invention, what we declare as new and desire to secure by Letters Patent of the United States is:

1. In a process for the separation of acetic acid and butyric acid existing together in the form of an aqueous solution, the step which comprises extracting at least a part of said aqueous solution with a liquid essentially comprising a mixture of more than 5% acetic acid with at least one hydrocarbon from the group consisting of toluene, cyclohexane, cyclohexene and methylcyclohexane, ethylene chloride, carbon tetrachloride, trichlorethylene, propylene chloride, to obtain an extract containing at least a portion of said butyric acid.

2. The process of separating acetic and butyric acids existing together in the form of an aqueous solution, which comprises extracting the aqueous solution with a solvent essentially comprising toluene.

3. In a process for the separation of acetic acid and butyric acid existing together in the form of an aqueous solution, the step which comprises extracting at least a part of said aqueous solution with a liquid essentially comprising a mixture of more than 5% acetic acid with toluene.

4. The process of separating acetic and butyric acid existing together in the form of an aqueous solution which comprises extracting the aqueous solution with the solvent cyclohexene to obtain an extract containing cyclohexene, acetic acid, and butyric acid, and then subjecting the extract to a distillation treatment whereby an azeotrope of cyclohexene and approximately 6% acetic acid is evolved.

5. The process of separating acetic and butyric acid existing together in the form of an aqueous solution which comprises extracting the aqueous solution with the solvent methylcyclohexane to obtain an extract containing methylcyclohexane, acetic acid, and butyric acid, and then subjecting the extract to a distillation treatment whereby an azeotrope of methylcyclohexane and acetic acid is evolved.

6. The process of separating acetic and butyric acids existing together in the form of an aqueous solution, which comprises extracting the aqueous solution with a solvent from the group consisting of toluene, cyclohexane, cyclohexene and methylcyclohexane, ethylene chloride, carbon tetrachloride, trichlorethylene, propylene chloride, said solvents being characterized in that they have a preferential solvent affinity for butyric acid, but do not form constant boiling mixtures with butyric acid, obtaining an extract containing solvent, acetic acid, and butyric acid, and then subjecting the extract to a distillation treatment wherein the solvent and acetic acid are removed and butyric acid obtained as a residue.

7. In the cyclic process of producing cellulose acetate butyrate, including treating cellulosic material in a bath which contains butyric and acetic compounds by steps which produce cellulose acetate butyrate, isolating the cellulose acetate butyrate in the bath in a manner which yields an aqueous solution containing acetic and butyric acids, the steps which comprise contacting at least a portion of this solution and a solvent from the group consisting of toluene, cyclohexane, cyclohexene and methylcyclohexane, ethylene chloride, carbon tetrachloride, trichlorethylene, propylene chloride, to obtain an extract liquid containing a substantial amount of butyric acid in the presence of solvent and some acetic acid, subjecting the extract liquid to distillation for obtaining butyric acid therefrom.

GALE F. NADEAU.
WEBSTER E. FISHER.